(12) United States Patent
Amblard et al.

(10) Patent No.: US 10,507,447 B1
(45) Date of Patent: Dec. 17, 2019

(54) DEVICE FOR DISTRIBUTING A POLYPHASE MIXTURE IN A CHAMBER CONTAINING A FLUIDIZED MEDIUM

(71) Applicant: IFP Energies nouvelles, Rueil-Malmaison (FR)

(72) Inventors: Benjamin Amblard, Rueil-Malmaison (FR); Sina Tebianian, Rueil-Malmaison (FR); Ludovic Raynal, Rueil-Malmaison (FR); Thierry Gauthier, Rueil-Malmaison (FR); Jean-Francois Le Coz, Saint Germain en Laye (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/429,730

(22) Filed: Jun. 3, 2019

(30) Foreign Application Priority Data

Jun. 6, 2018 (FR) ...................................... 18 54921

(51) Int. Cl.
| | |
|---|---|
| *B01J 8/22* | (2006.01) |
| *C10G 49/16* | (2006.01) |
| *C10G 47/30* | (2006.01) |
| *B01J 8/18* | (2006.01) |
| *B01J 8/12* | (2006.01) |

(52) U.S. Cl.
CPC ............. *B01J 8/1872* (2013.01); *B01J 8/125* (2013.01); *B01J 8/22* (2013.01); *C10G 47/30* (2013.01); *C10G 49/16* (2013.01); *B01J 2208/00893* (2013.01); *B01J 2208/00938* (2013.01)

(58) Field of Classification Search
CPC ... B01J 8/1872; B01J 8/125; B01J 8/22; B01J 2208/00938; B01J 2208/00893; C10G 47/30; C10G 49/16
USPC .......................................................... 422/129
See application file for complete search history.

(56) References Cited

U.S. PATENT DOCUMENTS

| | | | | |
|---|---|---|---|---|
| 3,912,460 A | * | 10/1975 | McGann ................ | B01J 8/1818 422/143 |
| 4,664,888 A | * | 5/1987 | Castagnos, Jr. ........ | B01J 8/0055 422/144 |
| 6,221,318 B1 | * | 4/2001 | Khouw .................. | B01J 8/0015 34/369 |

* cited by examiner

*Primary Examiner* — Huy Tram Nguyen
(74) *Attorney, Agent, or Firm* — Millen White Zelano and Branigan, PC; Csaba Henter

(57) ABSTRACT

Device for distributing a light fluid phase (2) in a heavy phase (4) in the fluidized state in a reaction chamber (5), comprising: a pipe (1) for transporting the light fluid phase; first and second windows (7, 8) created in the pipe, the second windows opening into the reaction chamber; and branches (6) extending each first window and splitting into: a central passage opening into the reaction chamber via an intermediate window (9) created in the upper wall of the branch (6); and at least two distinct lateral branches forming two lateral passages (10) opening into the reaction chamber via end-of-branch windows (11).

15 Claims, 6 Drawing Sheets

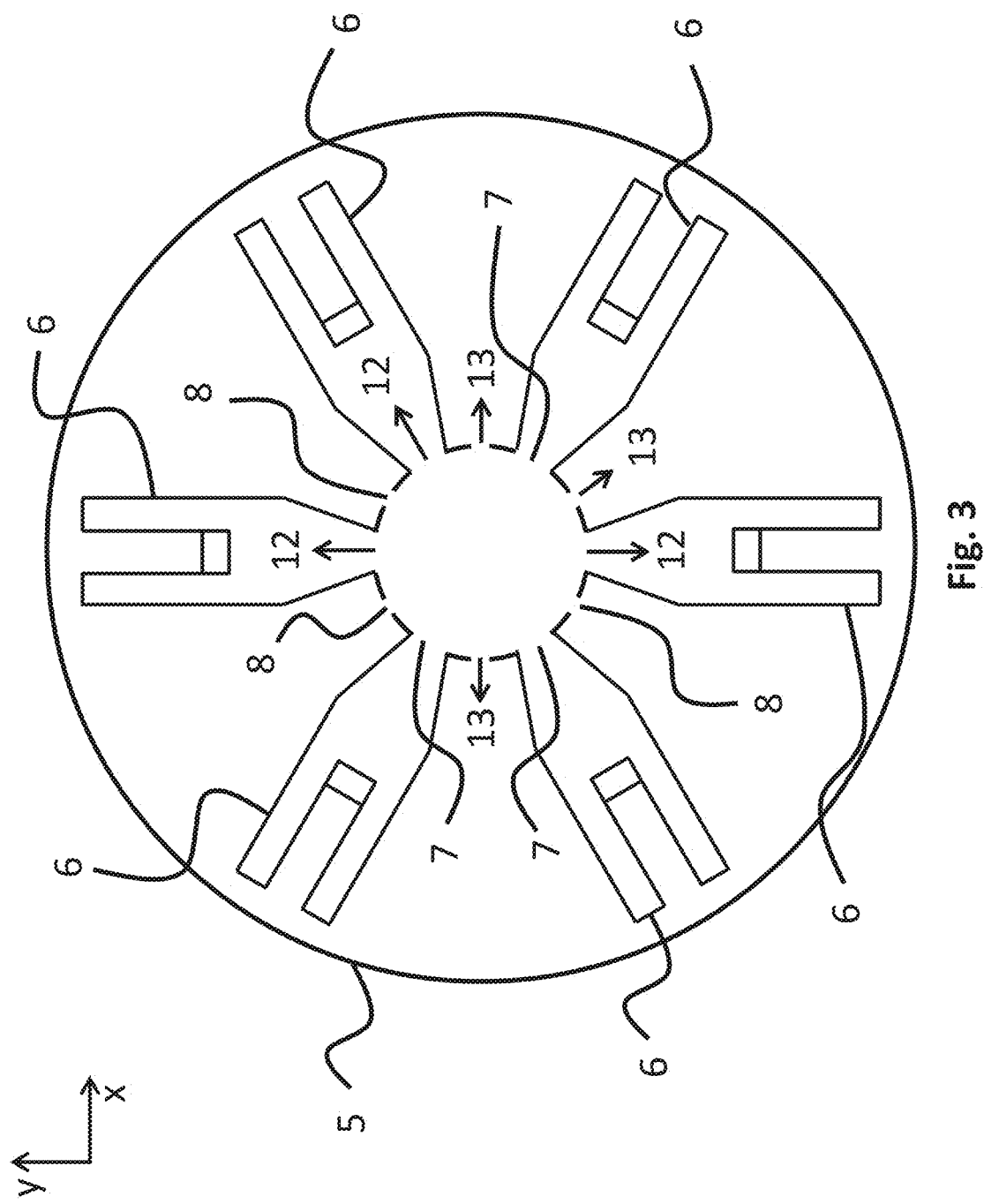

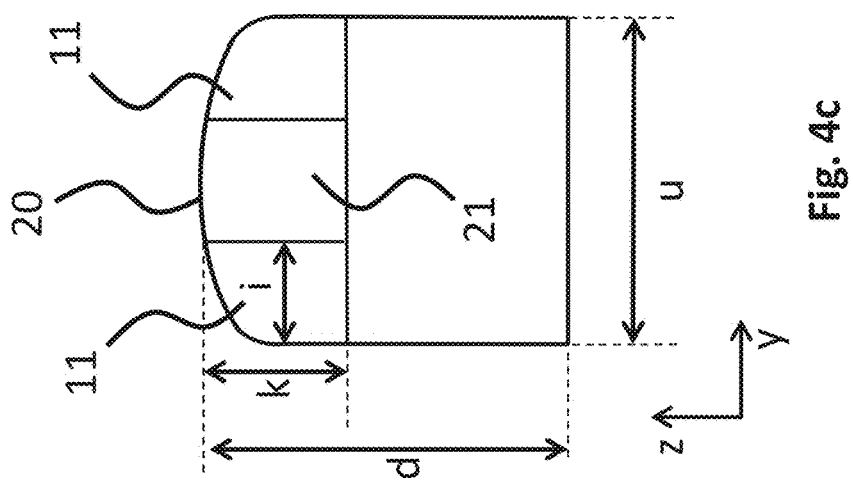
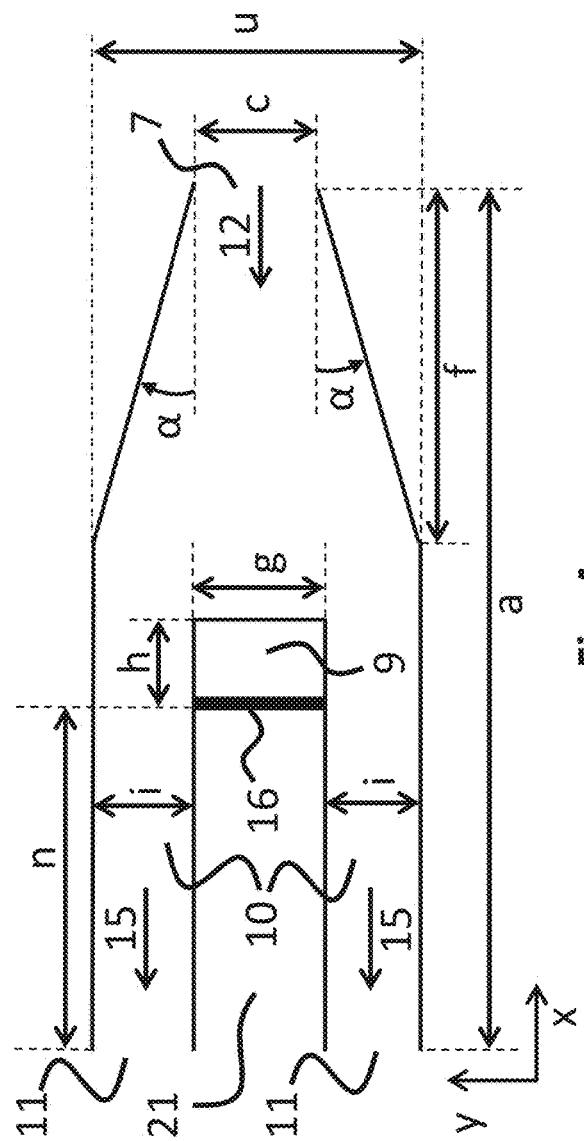
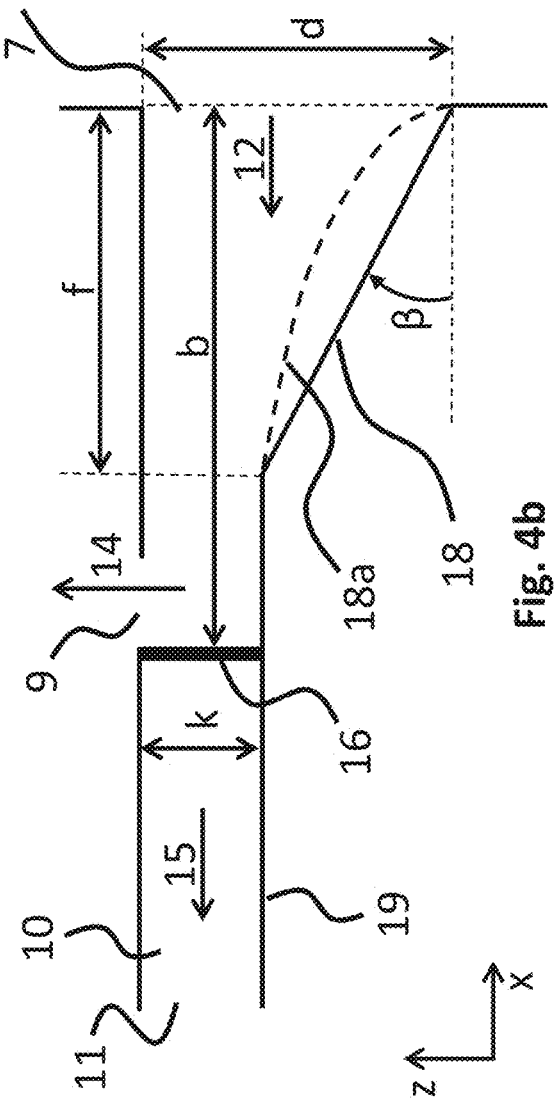
Fig. 4a
Fig. 4b
Fig. 4c

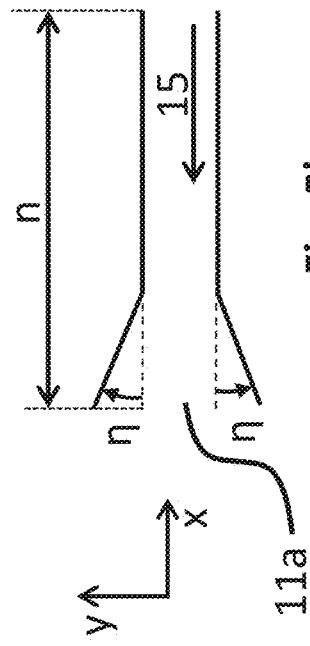
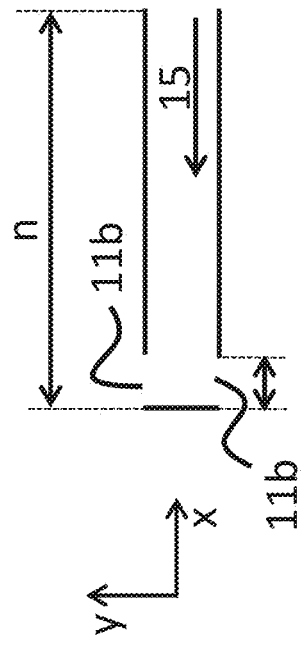
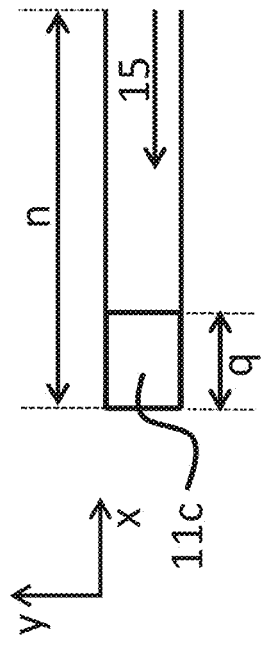
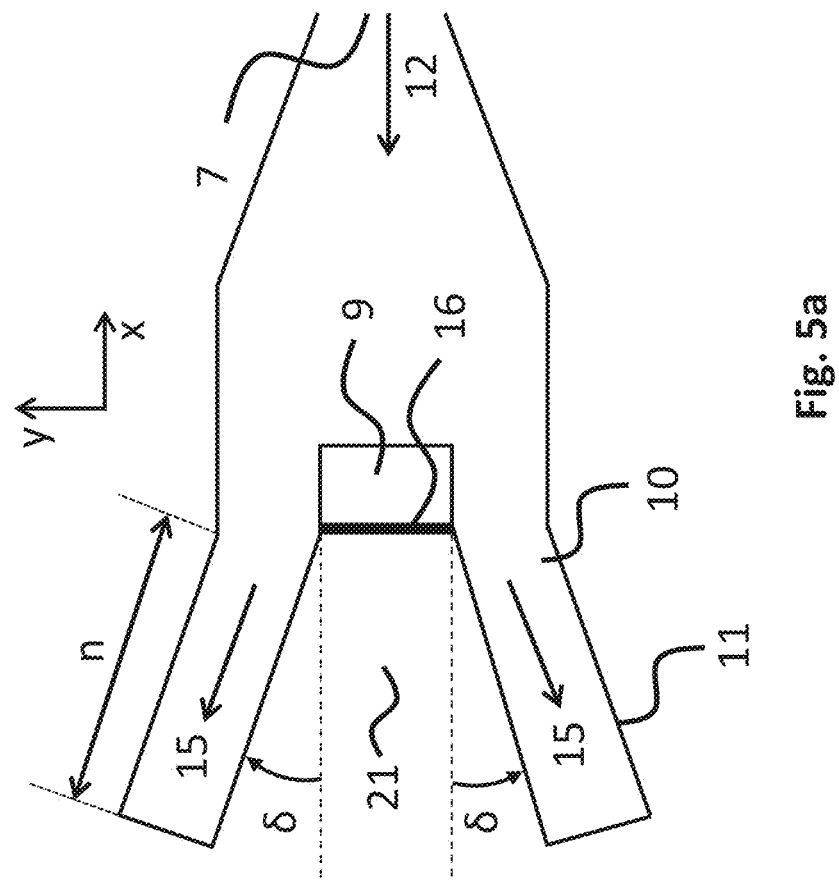

DEVICE FOR DISTRIBUTING A POLYPHASE MIXTURE IN A CHAMBER CONTAINING A FLUIDIZED MEDIUM

TECHNICAL FIELD

The present description contributes to improvements in the design of distributors for the distribution of a fluid phase, generally a light fluid phase, in a reaction chamber containing a fluid phase, generally a dense fluid phase. Generally, in the context of fluidized beds, the light fluid phase is a gas, gas-solid, gas-liquid, liquid or liquid-solid phase, and the dense fluid phase is the fluidized bed itself, that is to say the suspension of solid particles dispersed in gas and/or liquid.

In the case of the reaction chamber being a fluidized bed, which contains a solid phase (which may or may not be catalytic) held in suspension in the pseudo-fluid state by the passage of a gaseous or liquid fluid, a mixture of gaseous and liquid fluids, or a pseudo-fluid consisting of gas or liquid containing particles in suspension, the distribution has the essential role of maintaining the fluidization of the solid in the reaction chamber while ensuring proper mixing of all of the phases, by means of which it is possible to have good homogeneity of the products within the fluidized bed.

It is therefore vital to ensure good distribution of the fluid phases at their entry into the reaction chamber. That is all the more important in the case of a chemical reaction taking place in the fluidized bed, since in that context any bypass or dead zone, which would be detrimental to the process, is to be avoided.

PRIOR ART

The U.S. Pat. No. 5,571,482 describes a gas distributor located at the top of an ascending co-current gas-solid fluidized bed reactor (riser) in a regenerator, comprising a mushroom-shaped lid provided with orifices and comprising notches on the rim of the lid.

The patent FR3006607 describes a distributor for distributing a light phase in a dense phase comprising a deflection means located on the outer surface of the lid.

The U.S. Pat. No. 5,156,817 describes a distributor provided with a plurality of distribution arms of which the section is triangular and of which the lower edges are serrated.

The U.S. Pat. No. 6,221,318 describes a distributor provided with a plurality of distribution arms which have different ends.

SUMMARY

In the above-described context, a first object of the present invention is to provide distribution devices with which it is possible to achieve a better distribution of a first fluid phase (i.e. the light phase) in a reaction chamber containing a second fluid phase (i.e. the heavy phase), the density of which is greater than that of the light fluid phase that is to be distributed. This difference in density may be due either to a volume fraction of solid, or to a volume fraction of liquid of the injected phase smaller than that of the phase contained in the capacity in which the phases are to be mixed. A second object of the present invention is to provide distribution devices with which it is possible to achieve better mixing between the phases and better reaction performance.

According to a first aspect, the above-mentioned objects, as well as other advantages, are obtained with a device for distributing a light fluid phase within a heavy phase in a reaction chamber containing said heavy phase (e.g. in the fluidized state), the device comprising:
- a pipe for transporting the light fluid phase to the reaction chamber, the pipe being in particular designed to open into the reaction chamber;
- first windows and second windows created in a lateral wall of the pipe, the second windows opening directly into the reaction chamber; and
- branches extending each first window in a branch axis that is essentially perpendicular to the axis of symmetry of the pipe, in which each branch splits, in a plane essentially orthogonal to the axis of symmetry of the pipe, into:
- a central passage opening into the reaction chamber via an intermediate window created in an upper wall of the branch; and
- at least two distinct lateral branches forming two lateral passages opening into the reaction chamber via end-of-branch windows.

According to one or more embodiments, the first windows are designed such that a first portion of the light fluid phase distributed over the periphery of the reaction chamber leaves via the first windows with a first velocity, the second windows are designed such that a second portion of the light fluid phase distributed over the central part of the reaction chamber leaves via the second windows with a second velocity, the passage sections of the first and second windows are formed such that the first velocity and the second velocity are between $0.1 \times V$ and $30 \times V$, where V refers to the velocity of said light fluid phase in the pipe and is between 1 m/s and 100 m/s.

According to one or more embodiments, the intermediate windows are designed such that a central part of the first portion of the light fluid phase is distributed at an intermediate position of the reaction chamber and leaves via the intermediate windows with a third velocity, the end-of-branch windows are designed such that lateral parts of the first portion of the light fluid phase are distributed at an outer position of the reaction chamber and leave via the end-of-branch windows with a fourth velocity, the passage sections of the intermediate windows and of the end-of-branch windows are formed such that the third velocity and the fourth velocity are between $0.5 \times V2$ and $3 \times V2$, where V2 is the second velocity.

According to one or more embodiments, the branches are of length a, a being between $0.1 \times D$ and $0.5 \times D$, where D is the diameter of the reaction chamber.

According to one or more embodiments, the first and second windows are arranged in alternation, and/or are present in even numbers, and/or are present in equal numbers, in order in particular to ensure symmetric flow.

According to one or more embodiments, the width of the passage section formed by the branch increases in linear, curved or crenelated fashion starting from the pipe.

According to one or more embodiments, the width of the branches is increased starting from the pipe in the branch axis according to two angles α over a distance f, the angle α being between 0° and 60°, the distance f being between $0 \times a$ and $1 \times a$, where a is the length of the branches.

According to one or more embodiments, the height of the passage section formed by the branch decreases in linear, curved or crenelated fashion starting from the pipe.

According to one or more embodiments, the height of the branches is reduced starting from the pipe in the branch axis with an angle β over a distance f, the angle β being between 0° and 85°, the distance f being between 0×a and 1×a, where a is the length of the branches.

According to one or more embodiments, the distance b, in the branch axis between the pipe and a central wall that splits the branch into said central passage and said lateral passages, is between 0.1×a and 0.9×a, where a is the length of the branches.

According to one or more embodiments, the intermediate window is positioned at the edge of the central wall.

According to a second aspect, the above-mentioned objects, as well as other advantages, are obtained with a reactor comprising a distribution device according to the first aspect.

According to one or more embodiments, the reactor comprises a single distribution device. According to one or more embodiments, the reactor comprises a plurality of distribution devices.

According to a third aspect, the above-mentioned objects, as well as other advantages, are obtained with a process for catalytic cracking with two regeneration regions, using the distribution device according to the first aspect, for the purpose of making a catalyst pass from a first regeneration region to a second, turbulent fluidized bed regeneration region.

According to one or more embodiments, the reaction conditions of the first regeneration region are as follows:
  temperature: between 600° C. and 750° C.;
  pressure: between 0.15 MPag and 0.3 MPag;
  gas surface velocity: between 0.5 m/s and 1.5 m/s;
  FCC catalyst (silica-alumina matrix with zeolite and additive);
  regenerator "charge": coked catalyst (coke formed of carbon, hydrogen, nitrogen and sulfur).

According to one or more embodiments, the reaction conditions of the second regeneration region are as follows:
  temperature: between 690° C. and 750° C.;
  pressure: between 0.1 MPag and 0.3 MPag;
  gas surface velocity: between 0.5 m/s and 1.5 m/s;
  FCC catalyst (silica-alumina matrix with zeolite and additive);
  regenerator "charge": coked catalyst (coke formed of carbon, hydrogen, nitrogen and sulfur).

According to a fourth aspect, the above-mentioned objects, as well as other advantages, are obtained with a process for processing biomass, using the distribution device according to the first aspect, for the purpose of introducing a gas phase, or a gas-solid suspension, into a fluidized medium, for example into a catalytic pyrolysis reactor, for example introducing hydrogen and/or solid particles into a fluidized medium containing solid particles.

According to one or more embodiments, the reaction conditions in the catalytic pyrolysis reactor are as follows:
  temperature: between 500° C. and 650° C.;
  pressure: between 0.5 MPag and 0.7 MPag;
  gas surface velocity: between 0.3 m/s and 1.5 m/s;
  silica-alumina matrix catalyst with additive;
  solid charge: biomass.

According to a fifth aspect, the above-mentioned objects, as well as other advantages, are obtained with a process for hydrotreating heavy petroleum fractions using the distribution device according to the first aspect, for the purpose of introducing hydrogen into a fluidized medium containing solid particles (e.g. catalyst) and optionally a heavy hydrocarbon phase that is to be processed.

According to one or more embodiments, the reaction conditions in the catalytic pyrolysis reactor are as follows:
  temperature: between 390° C. and 460° C.;
  pressure: between 15 MPag and 20 MPag;
  gas surface velocity: between 2 cm/s and 8 cm/s;
  liquid surface velocity: between 2 cm/s and 8 cm/s;
  H-Oil™ catalyst (e.g. group VI metal and group VIII metal on alumina);
  charge: atmospheric residue and/or vacuum residue.

Groups of chemical elements are given according to the CAS classification (CRC Handbook of Chemistry and Physics, published by CRC Press, Editor in Chief D. R. Lide, 81st edition, 2000-2001). For example, Group VIII according to the CAS classification corresponds to the metals of columns 8, 9 and 10 according to the new IUPAC classification.

Embodiments according to the aspects which are referenced above and also other characteristics and advantages of the devices and processes according to the abovementioned aspects will become apparent on reading the description which will follow, given solely by way of illustration and without limitation, and with reference to the following drawings.

BRIEF DESCRIPTION OF THE DRAWINGS

FIG. 3 is a schematic view of the branches of a distribution device according to embodiments of the present description.

FIGS. 4a, 4b and 4c are schematic views of a branch of a distribution device according to embodiments of the present description.

FIGS. 5a, 5b, 5c and 5d are schematic views of the lateral passages of a branch of a distribution device according to embodiments of the present description.

Generally, similar elements are indicated by identical references in the figures.

DETAILED DESCRIPTION

Figure 1:
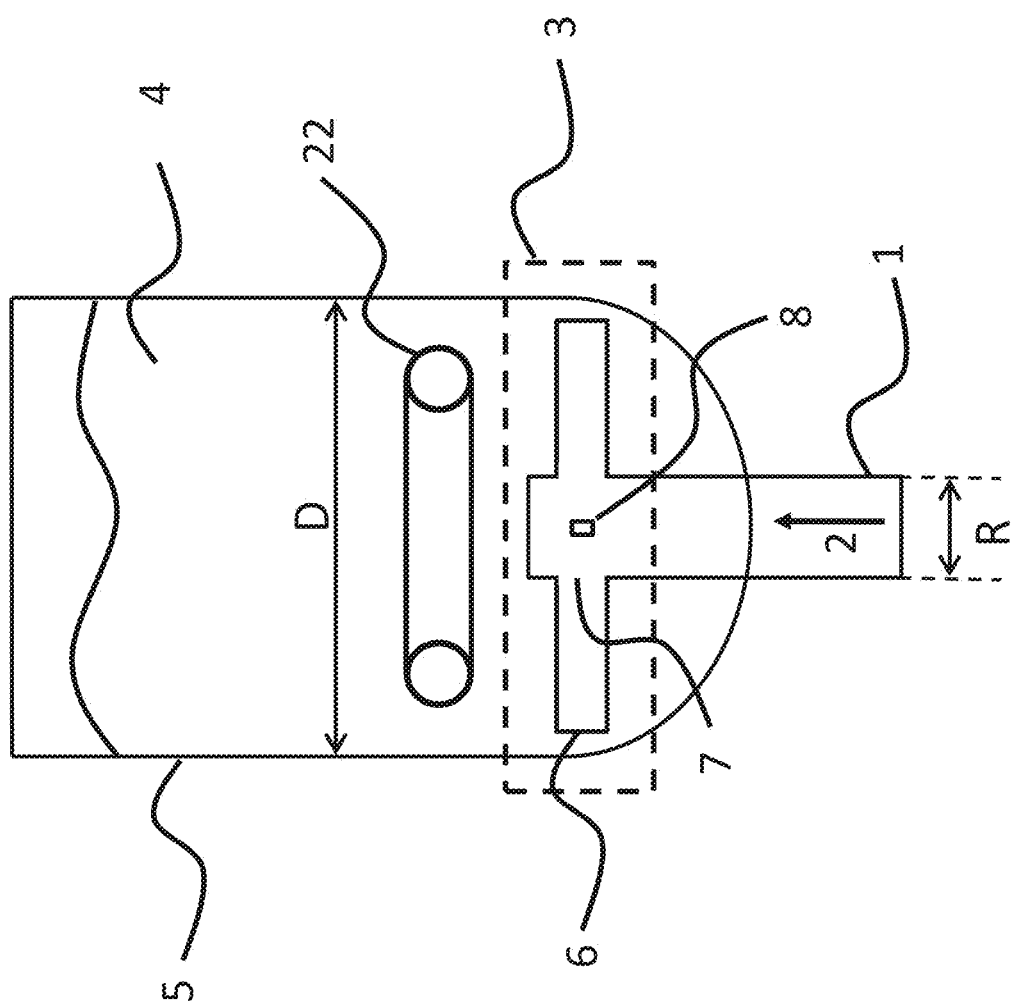
FIG. 1 is a schematic view of a reactor comprising a distribution device according to embodiments of the present description.

The distribution device according to the present description may be defined as a device for distributing a light fluid phase within a heavy phase (i.e. a mix of higher density fluids) in a reaction chamber containing said heavy phase, for example in the fluidized state.

The light fluid phase may be a gas, gas-solid, gas-liquid, liquid or liquid-solid phase. According to one or more embodiments, the light fluid phase is a gas-solid or liquid-solid phase. According to one or more embodiments, the light fluid phase is a gas-solid phase.

The heavy phase may be a gas-solid emulsion or even a three-phase gas-solid-liquid medium, such as for example in processes for hydrotreating petroleum fractions. According to one or more embodiments, the volumetric mass ratio between the heavy phase and the light phase is between 1.1 and 5000.

The distribution device according to the present description is in particular designed for the distribution of a light fluid phase in a fluidized bed reactor such as a three-phase ebullated fluidized bed reactor in which the solid catalyst is fluidized by a mixture of reactant fluids comprising a gas and a liquid. The distribution device according to the present description is particularly well-suited to distributing a gas-solid or gas-liquid phase at high temperature in a fluidized bed reactor. That is for example the case of the staged regeneration of catalyst in the FCC R2R™ process for conversion of residue, in which the catalyst undergoes a first regeneration step in a fluidized bed reactor, then a second regeneration step in a fluidized bed reactor in which the catalyst is very preferably distributed homogeneously over the entire section of the second regeneration stage, in particular in order to promote combustion reactions and limit temperature differences.

The distribution device according to the present description is particularly well-suited when the light fluid phase comprises hydrogen, and when the dense fluid phase comprises a petroleum residue, in particular for implementation in an ebullated-bed hydroconversion step using a three-phase fluidized reactor.

In the context of the process for catalytic cracking with two regeneration stages, the distribution device according to the present description may be used to transfer the catalyst from a first regeneration region to a second, turbulent fluidized bed regeneration region.

In the context of a process for processing biomass, the distribution device according to the present description may be used to introduce a gas phase or a gas-solid suspension into the fluidized medium of the biomass-processing reactor.

In the context of a process for hydrotreating heavy petroleum fractions, the distribution device according to the present description may be used to introduce hydrogen into a fluidized medium containing catalyst particles and a heavy hydrocarbon phase that is to be processed.

More generally, the distribution device according to the present description may be used in:
  reactors for fluidized-bed catalytic cracking (FCC) processes,
  reactors for the regeneration of catalysts, for example catalytic cracking (e.g. FCC) catalysts,
  reactors comprising a fluidized bed of catalysts,
  hydrotreating or hydrocracking reactors operating in upflow with introduction of a two-phase gas-liquid or gas-solid flow in the bottom of the reactor chamber,
  "slurry" type reactors (i.e. comprising a solid phase dispersed in a fluid),
  strippers, dryers, aerators or humidifiers, and
  catalytic pyrolysis reactors.

More precisely, with reference to FIG. 1, the distribution device according to the present description comprises a pipe 1 of diameter R that is designed to project into the lower part of the reactor chamber 5 containing the heavy phase 4 in the fluidized state, and designed to transport, with a velocity V, the light fluid phase 2 to the reaction chamber 5.

According to one or more embodiments, the distribution device is installed in a reaction chamber 5 of diameter D between 0.5 m and 50 m, preferably between 1 m and 30 m, and preferredly between 2 m and 20 m.

According to one or more embodiments, the distribution device is used to distribute the light fluid phase 2 in the reaction chamber 5 below or above a gas injector 22 which may be in the shape of a ring.

According to one or more embodiments, the pipe 1 is cylindrical.

According to one or more embodiments, the upper end of the pipe 1 is essentially centred on the axis of symmetry (i.e. vertical central axis) of the reaction chamber 5.

According to one or more embodiments, the pipe 1 is vertical. The pipe 1 is preferably vertical if it transports a multi-phase light fluid phase 2.

According to one or more embodiments, the ratio of the diameter R of the pipe 1 to the diameter D of the reaction chamber 5 is between 0.005 and 0.9, preferably between 0.01 and 0.5, and preferredly between 0.1 and 0.3.

On the upper part of the pipe 1, also referred to as the inlet tube, first windows 7 and second windows 8 are created/opened in the lateral wall of said pipe 1.

In the upper portion of the pipe 1, a distributor 3 is also arranged so as to distribute the light fluid phase 2 at different radial positions in the reaction chamber 5.

The distributor 3 comprises a plurality of branches 6 (also referred to as lateral pipes) extending (e.g. from) each first window 7, starting from the pipe 1, along a branch axis that is essentially perpendicular to the axis of symmetry of the pipe 1

Figure 2B:
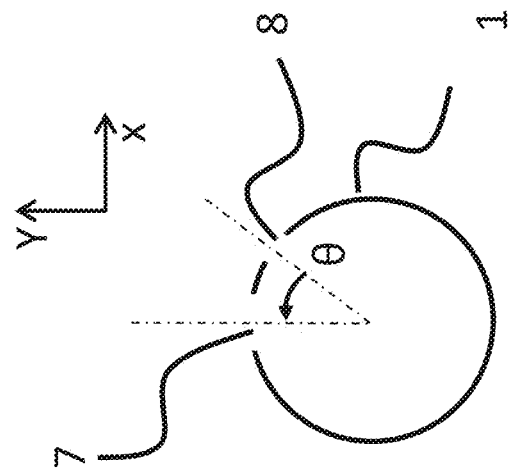
FIGS. 2a, 2b are schematic views of a pipe of the distribution device according to embodiments of the present description.
Figure 2A:
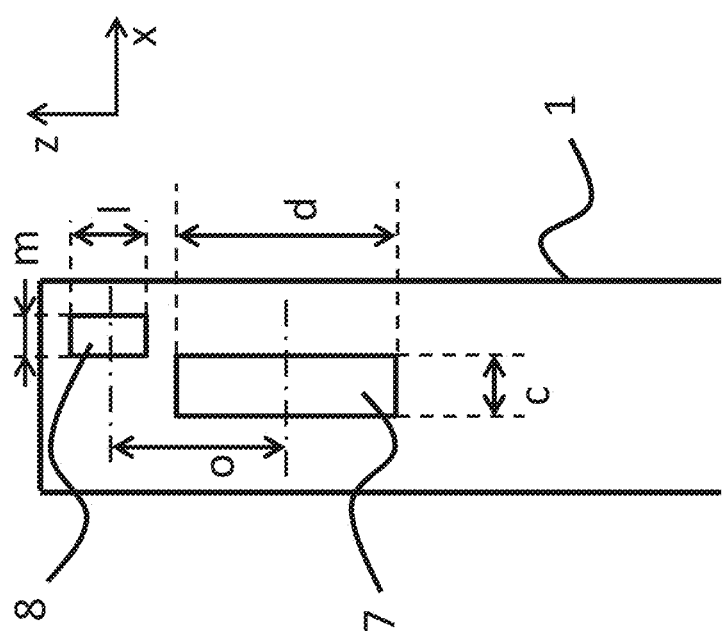

With reference to FIGS. 2a and 2b, according to one or more embodiments, the first windows 7 and/or the second windows 8 are essentially rectangular in shape, the first windows 7 having a width c and a height d (and hence a passage section cxd), the second windows 8 having a width m and a height l (and hence a passage section mxl). It is understood that the first windows 7 and/or the second windows 8 may be openings of any shape (e.g. square, triangular, circular, etc.).

According to one or more embodiments, the first and second windows 7 and 8 are arranged in alternation. According to one or more embodiments, the first and second windows 7 and 8 are present in even numbers in total, and/or in equal numbers.

According to one or more embodiments, the number of first windows 7 and/or of second windows 8 is between 2 and 48, preferably between 4 and 24, and preferably between 4 and 12.

According to one or more embodiments, the centres of the first and second windows 7 and 8 are separated by a distance o over the axis of symmetry z of the pipe 1, and/or are offset by an angle θ in the xy plane orthogonal to the axis of symmetry z of the pipe 1.

According to one or more embodiments, the angle θ is between 0° and 180°, and preferably between 0° and 90°.

According to one or more embodiments, the first windows 7 are arranged below the second windows 8 on the axis of symmetry z.

According to one or more embodiments, the distance o over the axis of symmetry z between the centre of the first and second windows 7 and 8 is between 0×d and 2×d, and preferredly between 0×d and 1×d.

According to one or more embodiments, the distance o over the axis of symmetry z between the centre of the first and second windows 7 and 8 is between 0×d and 1×d, and the first and second windows 7 and 8 are arranged in alternation on the pipe 1.

With reference to FIG. 3, the branches 6 make it possible to distribute a first portion 12 of the light fluid phase 2 over the periphery of the reaction chamber 5. The second windows 8 open directly into the reaction chamber 5, making it possible in particular to distribute a second portion 13 of the light fluid phase 2 over the central part of the reaction chamber 5.

According to one or more embodiments, the first and second windows 7 and 8 are designed such that the first portion 12 leaves via the first windows 7 with a first velocity V1, whereupon it travels towards the branches 6, and the second portion 13 leaves directly into the reaction chamber 5 via the second windows 8 with a second velocity V2.

According to one or more embodiments, the passage sections of the first and second windows 7 and 8 are formed such that the first velocity V1 and the second velocity V2 are between 0.1×V and 30×V, preferably between 0.3×V and 20×V, and preferredly between 0.5×V and 10×V, where V refers to the velocity of said light fluid phase in the pipe 1 and is between 1 m/s and 100 m/s, and preferably between 3 m/s and 30 m/s.

With reference to FIGS. 4a, 4b and 4c, each branch 6 comprises a central wall 16 that is essentially perpendicular to the branch axis x and splits the branch 6 into three passages in an xy plane orthogonal to the axis of symmetry z of the pipe 1, of which one is a central passage opening into the reaction chamber 5 via an intermediate window 9 created in the upper wall of the branch 6, and of which two are distinct lateral branches (hereinafter termed lateral passages 10) arranged on either side of the central passage of length n, opening into the reaction chamber 5 via end-of-branch windows 11. According to one or more embodiments, the length n is between 0.1×a and 0.9×a, and preferably between 0.4×a and 0.8×a.

Thus, the first portion 12 of the light fluid phase 2 is divided into three parts, namely a central part 14 directed towards the central passage and two lateral parts 15 directed towards the two lateral passages 10. According to one or more embodiments, the device comprises additional lateral passages 10, for example such that the first portion 12 of the light fluid phase 2 can be divided into 5 parts or more. According to one or more embodiments, the central passage forms a central branch that is distinct from the lateral branches (for example, by means of two vertical walls, each vertical wall being arranged between the central branch and a lateral branch).

Thus defined, the distribution device according to the present description permits injection of the light fluid phase 2 into the reaction chamber 5 at three different positions over the xy plane, which is orthogonal to the axis of symmetry z of the pipe 1, which permits better distribution of the light fluid phase 2 compared to the conventional mushroom. Better distribution of the light fluid phase 2 in the chamber 5 makes it possible to achieve better mixing between the phases, and better reaction performance.

The three injection positions are: a central position close to the pipe 1 via the second windows 8, an intermediate position via the intermediate windows 9, and an outer position via the end-of-branch windows 11.

The distribution of the light fluid phase 2 via the various positions is regulated via the dimensions of the windows 7, 8, 9 and 11.

According to one or more embodiments, the branches 6 are of length a between 0.1×D and 0.5×D, and preferably between 0.2×D and 0.5×D.

According to one or more embodiments, the passage section formed by the branch 6 is constant or variable.

According to one or more embodiments, the passage section formed by the branch 6 varies in linear, curved or crenelated fashion starting from the pipe 1.

According to one or more embodiments, the width of the passage section formed by the branch 6 increases in linear, curved or crenelated fashion starting from the pipe 1.

According to one or more embodiments, in an xy plane orthogonal to the axis of symmetry z of the pipe 1, the branches 6 are of width c at the level of the first window 7 of the pipe 1, and of width u at a distance f from the first window 7, u being greater than c.

According to one or more embodiments, the distance f is between 0×a and 1×a, and preferably between 0.1×a and 0.6×a.

According to one or more embodiments, the width of the branches 6 (on the xy plane orthogonal to the axis of symmetry z of the pipe 1) increases starting from the pipe 1 in the branch axis x according to two angles α over the distance f, for example in order to avoid a sudden change in the width of the branches 6. For example, the width of the branches 6 may vary from c (width of the first windows 7) to $c+2\times f\times\tan(\alpha)$.

According to one or more embodiments, the angle α is between 0° and 60°, preferably between 0° and 30°, and preferredly between 0° and 20°.

According to one or more embodiments, the lower section of the branches 6 is closed.

According to one or more embodiments, the height of the passage section formed by the branch 6 decreases in linear, curved or crenelated fashion starting from the pipe 1.

According to one or more embodiments, the height of the branches 6 is reduced starting from the pipe 1 in the branch axis x, forming for example a lower wall 18 with an angle β over the distance f, the angle β being formed between the branch axis x and the lower wall 18.

According to one or more embodiments, the angle β is between 0° and 85°, preferably between 15° and 75°, and preferredly between 30° and 70°.

According to one or more embodiments, the central wall 16 of the branch 6 is essentially rectangular in shape, being of width g and of height k, and is located at a distance b from the pipe 1, along the branch axis x. It is understood that the central wall 16 may be a wall of any shape (e.g. square, triangular, circular, etc.).

According to one or more embodiments, the central wall 16 has a width g of between 0.1×u and 0.9×u, preferably between 0.15×u and 0.8×u and preferredly between 0.3×u and 0.6×u.

According to one or more embodiments, the height k of the central wall 16 is chosen such that the velocity V4 of the lateral parts 15 is between 0.5×V2 and 3×V2, preferably between 0.9×V2 and 2×V2.

According to one or more embodiments, the distance b between the central wall 16 and the pipe 1 is between 0.1×a and 0.9×a, and preferably between 0.4×a and 0.8×a.

According to one or more embodiments, the intermediate window 9 is essentially rectangular in shape, of length h over the branch axis of the pipe 1, and of width g (and hence a passage section g×h). It is understood that the intermediate window 9 may be an opening of any shape (e.g. square, triangular, circular, etc.).

According to one or more embodiments, the length h of the intermediate window 9 over the branch axis x is defined such that the velocity V3 of the central part 14 is between 0.5×V2 and 3×V2, and preferably between 0.9×V2 and 2×V2. According to one or more embodiments, the length h is between 0.2×g and 5×g, and preferably between 0.5×g and 2×g.

According to one or more embodiments, the intermediate window 9 is positioned at the edge of the central wall 16, such that in particular the central part 14 of the first portion 12 of the light fluid phase 2, which is blocked by the central wall 16, can exit to the reaction chamber 5 with a velocity V3 at an intermediate position of the branch 6 in the xy plane orthogonal to the axis of symmetry z of the pipe 1.

According to one or more embodiments, the lower wall 18 of the branch 6, and/or lower walls 19 of the lateral passages 10, are provided with an opening, in particular in order to facilitate the installation of a refractory material inside the branches 6 and/or the lateral passages 10, and to permit evacuation of the catalyst when the unit is shut down.

According to one or more embodiments, the lower wall 18 of the branch 6 has a rounded shape 18a, which in particular improves the introduction of the first portion 12 of the light fluid phase 2 in the branches 6. For example, the interior of the lower wall 18 of the branch 6 may be convex in shape.

According to one or more embodiments, the branches 6 comprise upper walls 20 that have a rounded shape, improving in particular the mechanical strength of the distributor 3. For example, the interior of the upper walls 20 may be convex in shape.

According to one or more embodiments, the space 21 between the lateral passages 10 is at least partially solid, improving in particular the mechanical strength of the distributor 3.

According to one or more embodiments, the end-of-branch windows 11 are essentially rectangular in shape, of height k and of width i (and hence a passage section k×i), such that in particular the lateral parts 15 of the first portion 12 of the light fluid phase 2 can exit to the reaction chamber 5 with a velocity V4. It is understood that the end-of-branch windows 11 may be openings of any shape (e.g. square, triangular, circular, etc.).

According to one or more embodiments, the width i of the lateral passages 10 is essentially equal to the length u minus the length g, all divided by 2. According to one or more embodiments, the height k of the lateral passages 10 is between 0.2×i and 5×i, and preferably between 0.5×i et 2×i.

With reference to FIGS. 5a, 5b, 5c and 5d, according to one or more embodiments, the lateral passages 10 have an orientation defined by an angle δ with respect to the branch axis x in the xy plane orthogonal to the axis of symmetry z.

According to one or more embodiments, the angle δ, defining the orientation of the lateral passages 10 with respect to the branch axis x in the xy plane orthogonal to the axis of symmetry z, is between 0° and 60°, preferably between 0° and 45°, and preferredly between 0° and 25°.

According to one or more embodiments, the lateral passages 10 are provided with a widening at their end, such as a widening of angle q over a predetermined length, making it possible in particular for the fluid passing through the end-of-branch window 11a to be slowed down, for example as a function of the value of the angle η.

According to one or more embodiments, the angle η, defining the end widening of the lateral passages 10, is between 0° and 80°, preferably between 0° and 45°, and preferredly between 0° and 25°.

According to one or more embodiments, the lateral passages 10 are equipped with at least one or two lateral end-of-branch windows 11b.

According to one or more embodiments, the lateral end-of-branch windows 11b are of length p over the branch axis x.

According to one or more embodiments, the length p of the lateral end-of-branch windows 11b is chosen such that the velocity V4 of the lateral parts 15 is between 0.5×V2 and 3×V2, preferably between 0.9×V2 and 2×V2.

According to one or more embodiments, the end-of-branch windows 11c are located on the upper part of the lateral passages 10.

According to one or more embodiments, the end-of-branch windows 11c are of length q over the branch axis x.

According to one or more embodiments, the length q of the end-of-branch windows 11c is chosen such that the velocity V4 of the lateral parts 15 is between 0.5×V2 and 3×V2, preferably between 0.9×V2 and 2×V2.

According to one or more embodiments, the distributor 3 has, mounted on top of it, a convex head (not shown), in particular for the purpose of improving the distribution of the second portion 13 exiting directly into the central part of the reaction chamber 5 via the second windows 8.

According to one or more embodiments, the convex head has passing through it the branches 6, which project beyond the circumference of said head.

According to one or more embodiments, the diameter of the head is between 0.05×D and 0.95×D, preferably between 0.2×D and 0.8×D, more preferably between 0.25×D and 0.75×D.

According to one or more embodiments, the convex head has notches that are regularly spaced all along its lower edge.

According to one or more embodiments, the notches are essentially triangular or rectangular in shape. It is understood that the notches may be openings of any shape (e.g. square, circular, etc.).

According to one or more embodiments, the notches are essentially rectangular, their width being between 0.01×F and 0.9×F, and their height being between 0.01×F and 0.9×F, where F is the height of the lower part of the head.

According to one or more embodiments, the notches are essentially triangular, the height of the triangle being between 0.01×F and 0.9×F, and the base of the triangle being between 0.01×F and 0.9×F, where F is the height of the lower part of the head.

According to one or more embodiments, the head is provided with orifices over its upper dome, said orifices having for example a diameter of between 1 and 100 mm, preferably between 10 and 50 mm.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 18/54.921, filed Jun. 6, 2018, are incorporated by reference herein.

EXAMPLES

The examples below correspond to a reference device and a distribution device according to the present description. Table 1 below presents the operating conditions and the dimensions of the reference device and of the distribution device according to the present description.

Figure 6B:
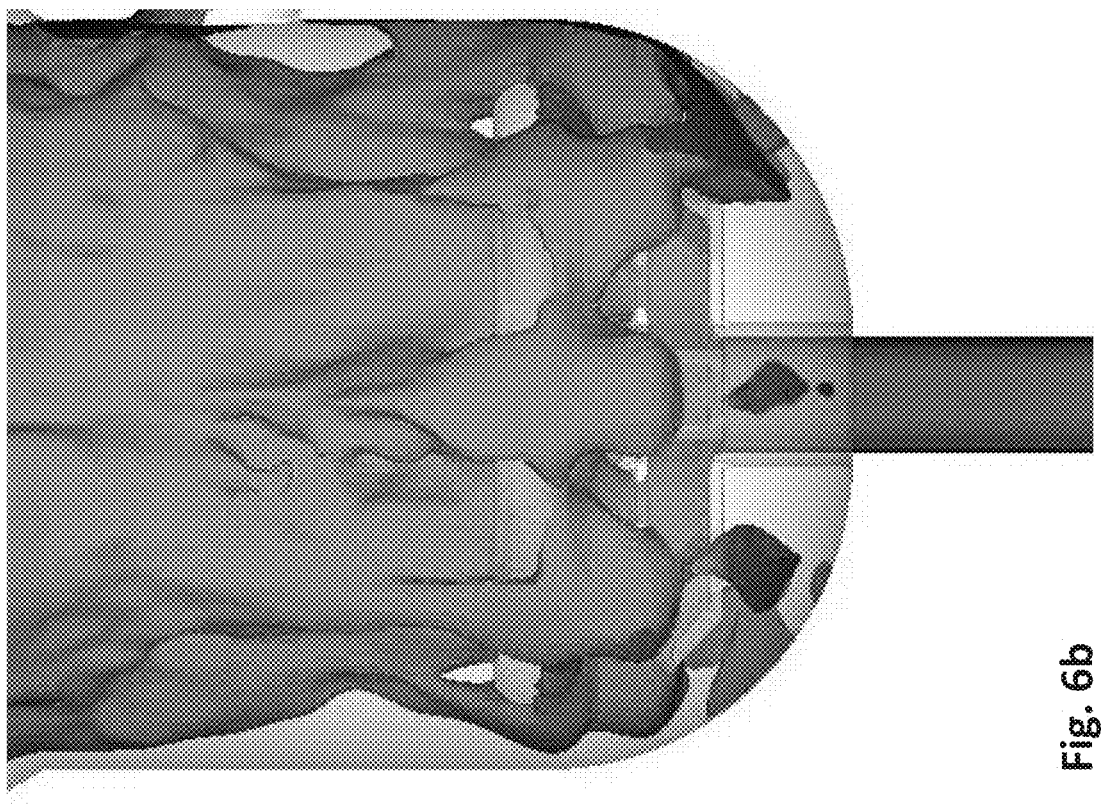
FIGS. 6a and 6b are visualisations produced by 3D simulations showing the dispersion of a fluid introduced into the reaction chamber by means of, respectively, a reference device and a distribution device according to embodiments of the present description.
Figure 6A:
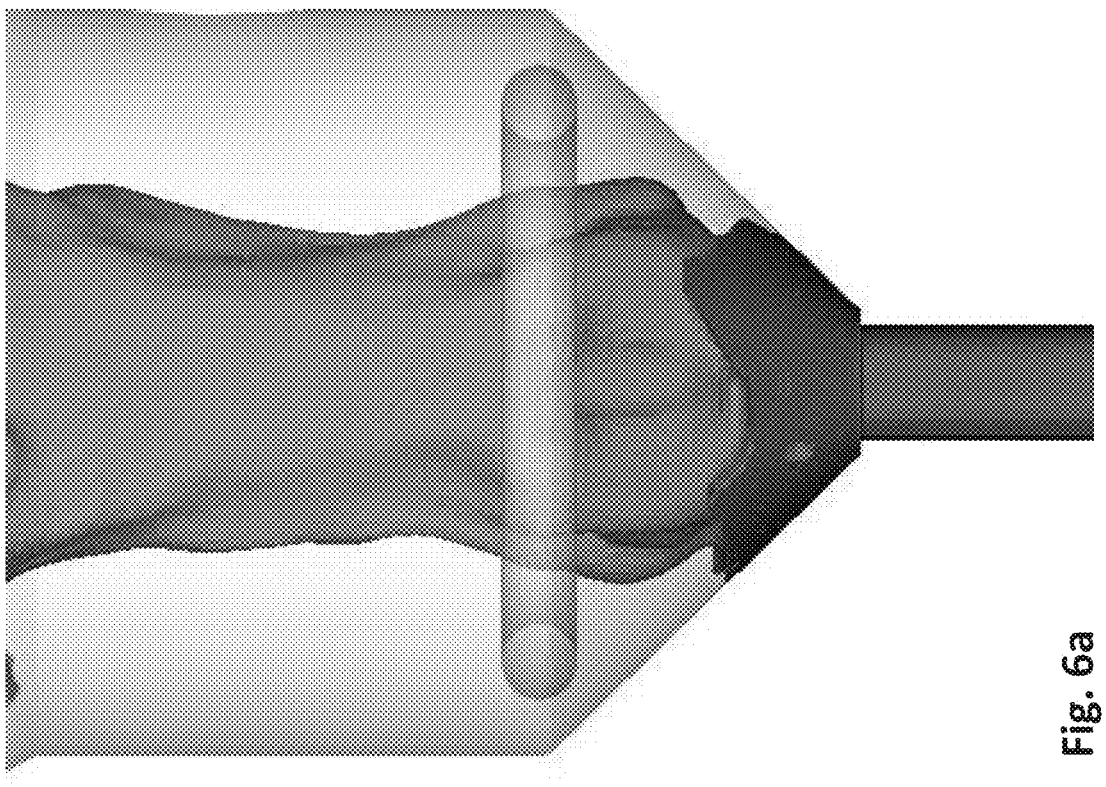

Three-dimensional computational fluid dynamics (CFD) simulations, of the reference device on one hand and of the distribution device according to the present description on the other hand, have been carried out and are depicted respectively in FIGS. 6a and 6b.

FIGS. 6a and 6b present the path of the light fluid phase 2 that is to be distributed in the heavy phase 4 coming from the pipe 1, respectively in the case of the reference device (FIG. 6a) and in the case of the distribution device according to the present description (FIG. 6b). To that end, these figures show the iso-volume of the percentage of gas coming from the pipe 1 in the total gas phase, between 10% and 100%.

With the device according to the present description, the distribution of the light fluid phase 2 coming from the pipe 1 is better, with the majority of the reaction chamber 5 being covered. The light fluid phase 2 occupies approximately 80% of the volume above the distributor 3, compared to 30% for the reference device.

Thus, the light fluid phase 2 is well dispersed and interacts more effectively with the heavy phase 4, which improves the performance of the reaction chamber compared to the reference device.

TABLE 1

| PIPE | |
|---|---|
| Diameter of pipe 1 (m) | 1.25 |
| REACTION CHAMBER | |
| Diameter of reaction chamber 5 (m) | 8 |
| OPERATING CONDITIONS | |
| Volumetric mass of particles (kg/m$^3$) | 1450 |
| Average particle diameter (microns) | 70 |
| Volumetric mass of gas (kg/m$^3$) | 0.9 |
| Gas in pipe 1/total gas in reaction chamber 5 (%) | 50 |
| REFERENCE DISTRIBUTOR | |
| Diameter of head (m) | 3.2 |
| Total number of windows | 8 |
| Number of holes | 95 |
| Diameter of holes (mm) | 100 |
| DEVICE ACCORDING TO THE PRESENT DESCRIPTION | |
| Number of first windows 7 | 4 |
| Number of second windows 8 | 8 |
| Surface area of second windows/total surface area of windows 7 + 8 (%) | 8 |
| Length a (m) | 2.7 |
| Angle α (°) | 15 |
| Angle β (°) | 30 |
| Angle δ (°) | 0 |
| Angle η (°) | 0 |
| Length f (m) | 1.1 |
| Length b (m) | 1.6 |
| Length u (m) | 0.7 |
| Length g (m) | 0.3 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A distribution device for distributing a light fluid phase (2) within a heavy phase (4) in a reaction chamber (5) containing said heavy phase (4), the device comprising:
   a pipe (1) for transporting the light fluid phase (2) to the reaction chamber (5);
   first windows (7) and second windows (8) in a lateral wall of the pipe (1), the second windows (8) opening directly into the reaction chamber (5); and
   branches (6) extending each first window (7) in a branch axis (x) that is essentially perpendicular to the axis of symmetry (z) of the pipe (1), in which each branch (6) splits, in a plane (xy) essentially orthogonal to the axis of symmetry (z) of the pipe (1), into:
   a central passage opening into the reaction chamber (5) via an intermediate window (9) in an upper wall of the branch (6); and
   at least two distinct lateral branches forming two lateral passages (10) opening into the reaction chamber (5) via end-of-branch windows (11).

2. The distribution device according to claim 1, in which:
   the first windows (7) are such that a first portion (12) of the light fluid phase (2) is distributed over the periphery of the reaction chamber (5) and leaves via the first windows (7) with a first velocity (V1),
   the second windows (8) are such that a second portion (13) of the light fluid phase (2) is distributed over the central part of the reaction chamber (5) and leaves via the second windows (8) with a second velocity (V2), and
   the passage sections of the first and second windows (7, 8) are formed such that the first velocity (V1) and the second velocity (V2) are between 0.1×V and 30×V, where V refers to the velocity of said light fluid phase (2) in the pipe (1) and is between 1 m/s and 100 m/s.

3. The distribution device according to claim 2, in which:
   the intermediate windows (9) are such that a central part (14) of the first portion (12) of the light fluid phase (2) is distributed at an intermediate position of the reaction chamber (5) and leaves via the intermediate windows (9) with a third velocity (V3),
   the end-of-branch windows (11) are such that lateral parts (15) of the first portion (12) of the light fluid phase (2) are distributed at an outer position of the reaction chamber (5) and leave via the end-of-branch windows (11) with a fourth velocity (V4), and
   the passage sections of the intermediate windows (9) and of the end-of-branch windows (11) are formed such that the third velocity (V3) and the fourth velocity (V4) are between 0.5×V2 and 3×V2, where V2 is the second velocity (V2).

4. The distribution device according to claim 1, in which the branches (6) are of length a, a being between 0.1×D and 0.5×D, where D is the diameter of the reaction chamber (5).

5. The distribution device according to claim 1, in which the first and second windows (7, 8) are arranged in alternation, and/or are present in even numbers, and/or are present in equal numbers.

6. The distribution device according to claim 1, in which the width of the passage section formed by the branch (6) increases in linear, curved or crenelated fashion starting from the pipe (1).

7. The distribution device according to claim 1, in which the width of the branches (6) is increased starting from the pipe (1) in the branch axis (x) according to two angles α over a distance f, the angle α being between 0° and 60°, the distance f being between 0×a and 1×a, where a is the length of the branches (6).

8. The distribution device according to claim 1, in which the height of the passage section formed by the branch (6) decreases in linear, curved or crenelated fashion starting from the pipe (1).

9. The distribution device according to claim 1, in which the height of the branches (6) is reduced starting from the pipe (1) in the branch axis (x) with an angle β over a distance f, the angle β being between 0° and 85°, the distance f being between 0×a and 1×a, where a is the length of the branches (6).

10. The distribution device according to claim 1, in which the distance b, in the branch axis (x) between the pipe (1) and a central wall (16) that splits the branch (6) into said central passage and said lateral passages (10), is between 0.1×a and 0.9×a, where a is the length of the branches (6).

11. The distribution device according to claim 1, in which the intermediate window (9) is positioned at the edge of the central wall (16).

12. A reactor, comprising a distribution device according to claim 1.

13. A process for catalytic cracking with two regeneration regions, comprising making a catalyst pass from a first regeneration region to a second, turbulent fluidized bed, regeneration region by the distribution device according to claim 1.

14. A process for processing biomass, comprising introducing a gas phase, or a gas-solid suspension, into a fluidized medium by the distribution device according to claim 1.

15. The process according to claim 14, wherein hydrogen and/or solid particles are introduced into a fluidized medium containing solid particles.

* * * * *